June 28, 1960  DE CARR C. BRADDY  2,942,586
VAPOR GENERATING AND SUPERHEATING UNIT
Filed Dec. 2, 1957  2 Sheets-Sheet 2
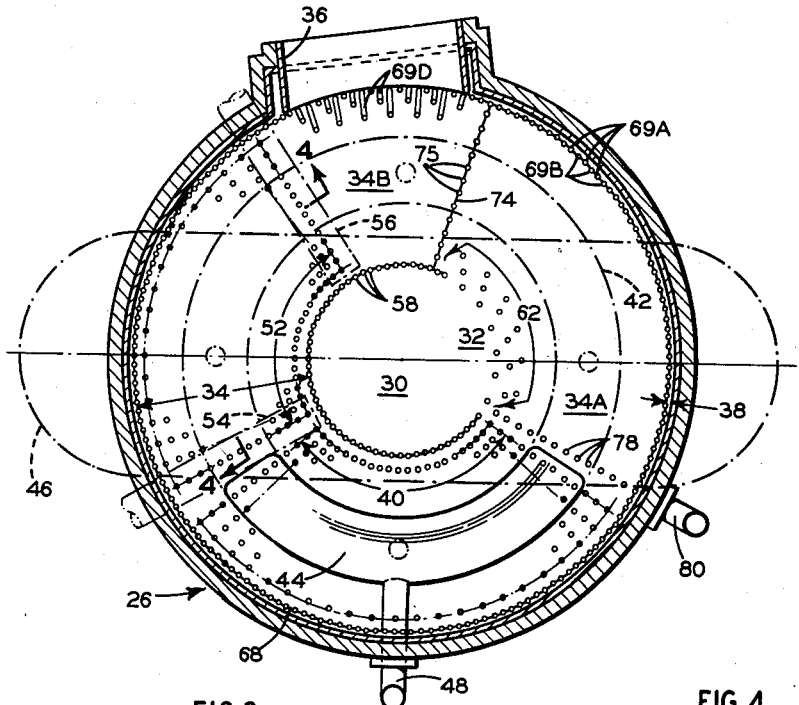
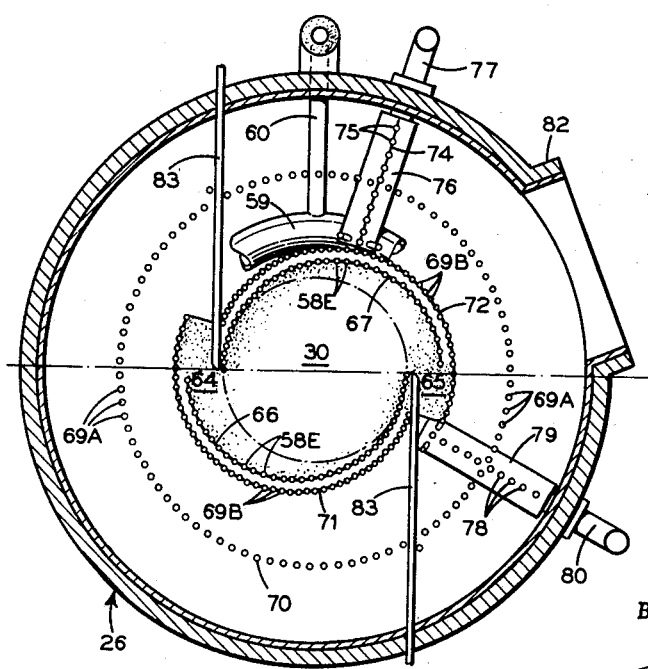
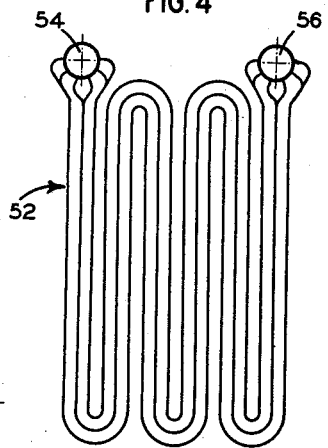
INVENTOR.
De Carr C. Braddy
BY
ATTORNEY

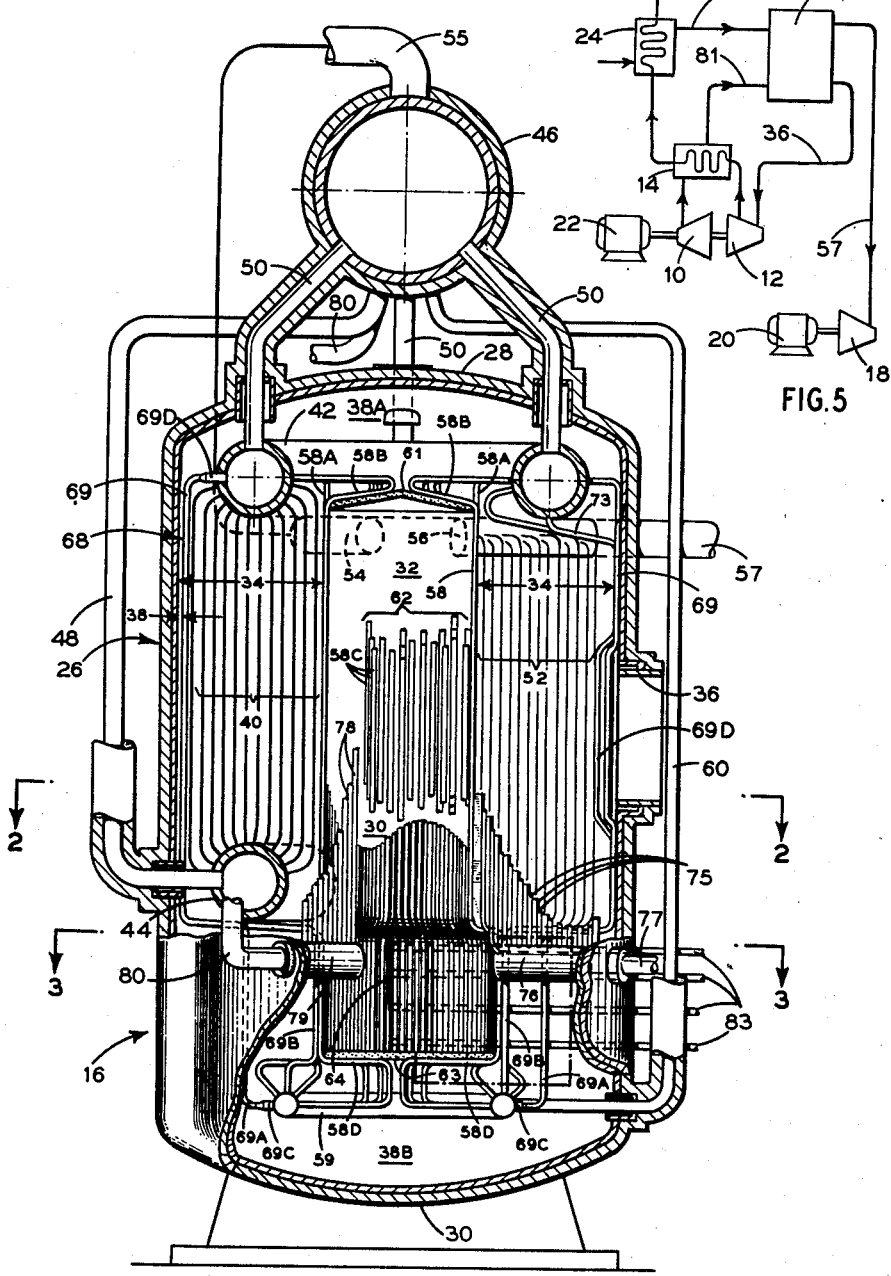

United States Patent Office 2,942,586
Patented June 28, 1960

2,942,586

VAPOR GENERATING AND SUPERHEATING UNIT

De Carr C. Braddy, Jamaica Estates, N.Y., assignor to The Babcock & Wilcox Company, New York, N.Y., a corporation of New Jersey Filed Dec. 2, 1957, Ser. No. 700,070

11 Claims. (Cl. 122—476)

This invention relates to the construction and operation of binary elastic fluid power plants and more particularly to improvements in the construction and operation of a fluid heating unit especially adapted for the generation of highly superheated high pressure vapor and high temperature high pressure gases for use in the production of power by a binary elastic fluid power plant.

In accordance with the invention, the fluid heating unit is of the supercharged type and is particularly adapted for use in a power plant including a vapor or steam turbine, a gas turbine, and an air compressor driven by the gas turbine. The term "supercharged" as used herein means a combustion process wherein the pressure of the gases generated in the fluid heating unit is of such magnitude that useful work may be done by these gases after leaving the fluid heating unit through expansion in a gas turbine to essentially atmospheric pressure. The invention provides for a fluid heating unit comprising an upright vessel and an upright combustion chamber arranged to receive fuel and high pressure combustion air and centrally disposed within the upright vessel. A substantially circular wall including upwardly extending fluid heating tubes is disposed between the combustion chamber and the upright vessel and cooperates with the combustion chamber to form a gas pass thereabout occupied by fluid heating surface and communicating with the combustion chamber. The circular wall also cooperates with the upright vessel to define a space which is maintained under an air pressure at least equal to the gas pressure in the combustion chamber to counter-balance the outward thrust of the heating gases exerted on the inside of boundary walls of the combustion chamber and the gas pass. The combustion chamber and gas pass are constructed and arranged so that the heating gases generated in the combustion chamber whirl upwardly therethrough to the gas pass, then flow through the gas pass and over the fluid heating surface disposed therein to the gas turbine. The construction and arrangement of the fluid heating unit of the invention provides a higher efficiency when incorporated in a combined gas turbine-vapor turbine power plant than the base steam or gas-turbine plants individually; provides a compact installation of reduced size or weight as compared to a conventional unit, largely due to higher heat transfer rates resulting from high gas density in the unit; minimizes the need for lateral steel supports for the boundary walls of the gas pass and the combustion chamber due to the relatively small pressure differential between the inside and the outside of these boundary walls; prevents blasting or leakage of heating gases through the boundary walls of the combustion chamber or the gas pass; and permits use of relatively simple fluid heating tube arrangements.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred form of my invention.

Of the drawings:

Fig. 1 is a partly diagrammatic sectional elevation of a supercharged steam generating and superheating unit constructed and operable in accordance with the invention;

Fig. 2 is a plan view taken along line 2—2 of Fig. 1;

Fig. 3 is a plan view taken along line 3—3 of Fig. 1;

Fig. 4 is a sectional elevation of the superheater taken along line 4—4 of Fig. 2; and Fig. 5 is a diagrammatic representation of the flow paths of the vaporizable fluid, the heating gases and the air in the binary fluid power plant with which the fluid heating unit of Figs. 1–4 is associated.

In the drawings the invention has been illustrated as embodied in a binary elastic fluid power plant intended for central station use. The particular power plant illustrated has a net combined output of 57,700 kw., with the steam turbine supplying 39,400 kw. and the gas turbine 18,300 kw., which represents 32 percent of the plant rating. The bottom-supported supercharged natural circulation fluid heating or steam generating unit is designed on natural gas firing for a maximum continuous steam output of 285,000 lbs. of steam per hour at a pressure of 1265 p.s.i. and a total temperature of 950° F. at the superheater outlet, and a maximum continuous gas discharge from the steam generating unit to the gas turbine of 450,000 lbs. of gas per hour at a temperature of 1450° F. and a pressure of 80 p.s.i.a. While the fluid heating unit construction illustrated and hereinafter described is specifically designed and particularly adapted for natural circulation and for firing by a gaseous fuel, it will be understood that the fluid heating unit illustrated may also be adapted for forced circulation of fluid and for firing by liquid fuels and by various types of slag-forming fuels.

In the binary elastic fluid power plant illustrated in Fig. 5, a compressor 10, driven by a gas turbine 12, discharges air at a pressure of about 83 p.s.i.a. through an air heater 14 to a supercharged natural circulation fluid heating unit 16. The fluid heating unit is constructed and arranged to deliver steam to a vapor or steam turbine 18, while passing high temperature high pressure gases to the gas turbine 12. The vapor turbine 18 drives an electric generator 20 and the gas turbine drives an electric generator 22. Heat from the gas turbine exhaust is recovered by passing the gases over the air heater 14 to preheat the compressor discharge air before flowing to the fluid heating unit 16; and over an economizer 24 to partially heat the feedwater for the fluid heating unit.

In accordance with the invention, the fluid heating unit 16 comprises an upright insulation covered metallic vessel 26 of substantially circular cross-section closed at its upper and lower ends by substantially semi-elliptical walls or heads 28 and 30, respectively, and arranged with its major axis substantially vertical. An upright combustion chamber 30 of substantially circular cross-section is disposed concentrically and substantially symmetrically within the vessel 26, is closed at its opposite ends, and has an axially elongated gas outlet 32 in the circumferential wall thereof. An upright annular gas pass 34 is disposed about and defined in part by the circumferential wall of the combustion chamber 30, extends along about three-quarters of the height of the combustion chamber starting from the upper end thereof, and communicates at its gas inlet end 34A with the gas outlet 32 of the combustion chamber and at its discharge end 34B with the inlet of a circular metal conduit 36 extending through the circumferential wall of the vessel 26 in sealing relation therewith and having its outlet end connected to the intake of the gas turbine 12. The outer wall of the gas pass 34 cooperates with the vessel 26 to provide a space 38 of substantially annular horizontal cross-section communicating at its upper end with a space 38A formed between the upper portion of the vessel 26 and the upper boundaries of the combustion chamber 30 and gas pass 34 and at its lower end with a space 38B bounded by the lower end of the gas pass 34 and the lower portions of the combustion chamber 30 and the vessel 26.

An upright steam generating tube bank 40 occupies a portion of the gas pass 34 and includes radially spaced arc-shaped rows of upwardly extending tubes positioned across the flow of gases in the gas pass 34 and connected at their upper ends to a horizontally arranged ring-shaped tubular header 42 disposed centrally and forming a portion of the upper endn of the gas pass 34 and co-axially of the vessel 26 and connected at their lower ends to a horizontally arranged arc-shaped header 44 disposed centrally and within the lower portion of the gas pass 34. A horizontally extending insulation covered cylindrical liquid and vapor drum 46 is disposed superjacent the vessel 26, and is arranged with its vertical or minor axis in the same vertical plane as the vertical axis of the vessel 26. Liquid is supplied to the tube bank 40 by supply tubes 48 extending between the drum 46 and the header 44 and passing through the vessel 26 and the gas pass 34 in sealing relation therewith. Vapor-liquid mixtures generated in the tube bank 40 discharge to the drum 46 by way of riser tubes 50 extending between the header 42 and the drum 46 and passing through the head 28 of the vessel 26 in sealing relation therewith. An upright vapor superheating the tube bank 52 is positioned in the gas pass 34 between the tube bank 40 and the gas outlet 36 and includes nested multi-looped vertically extending tubes arranged in radially spaced arc-shaped platens to define parallel flow paths for vapor flow in parallel flow heat transfer relationship with the gases. The tubes of the bank 52 have their inlet and outlet ends connected to horizontally arranged radially extending headers 54 and 56, respectively. The headers 54 and 56 pass through the vessel 26 and the outer wall of the gas pass 34 in sealing relation therewith, are disposed in the upper portion of the gas pass 34 at a position subjacent the header 42, and are circumferentially spaced with respect to the gas pass 34. The superheater inlet header 54 is connected for vapor flow from the drum 46 by a tubular conduit 55 and the outlet header 56 is connected for vapor flow to the steam turbine 12 by a tubular conduit 57.

The combustion chamber 30 is formed by closely spaced tubes 58 having their intertube spaces closed by metallic webs welded to the tubes along the lengths thereof to provide a gas-tight enclosure. The tubes 58 have their upper ends connected to the header 42 and their lower ends connected to a horizontally arranged ring-shaped tubular header 59 disposed subjacent and coaxially of the combustion chamber 30. Liquid is supplied to the header 59 by tubes 60 extending between the header 59 and the drum 46 and passing through the vessel 26 in sealing relation therewith. Some of the tubes 58 have their upper portions 58A bent radially outwardly and horizontally for connection to the inner periphery of the header 42; and others of the tubes 58 have their upper portions 58B bent radially inwardly and upwardly in converging relation to form the upper end or roof of the chamber 30, and then reversely and radially outwardly and horizontally between the tube portions 58A to the inner periphery of the header 42 to form a portion of the upper end of the gas pass 34. A cone-shaped metallic plate 61 is secured to the inner side of the tube portions 58B and has its inner side covered with a layer of suitable refractory material. The horizontally extending parts of the tube portions 58A, 58B and the innermost reverse bends of the tube portions 58B have their intertube spaces closed by metallic webs to seal the upper end of the gas pass 34. Still others of the tubes 58 have their upper portions 58C bent into arc-shaped rows of widely spaced staggered tubes to provide a screen 62 for the heating gases and the heating gas outlet 32 in the circumferential wall of the combustion chamber 30, the outlet 32 extending between the lower end of the gas pass 34 and the upper end of the combustion chamber 30 and opening to the gas inlet 34A of the gas pass 34 along substantially the full height thereof.

Some of the tubes 58 have their lower portions 58D bent radially inwardly and downwardly in converging relation at a slight angle to the horizontal to form the lower end or floor of the combustion chamber 30, and then reversely and radially outwardly and horizontally to the inner periphery of the header 59. A circular metallic plate 63 is secured to the inner side of the tube portions 58D and has its inner side covered with a layer of suitable refractory material. Fuel and air are introduced into the combustion chamber 30 through axially elongated circumferentially spaced inlets 64 and 65 arranged tangentially to the outer end of involute curved portions 66 and 67, respectively, of the circumferential wall of the combustion chamber 30 at a location in the combustion chamber between the lower end and gas outlet 32 thereof. The involute curved portions 66, 67 of the combustion chamber 30 are formed by bending intermediate portions 58E of some of the tubes 58 and closing their intertube spaces with metallic webs.

An upright substantially circular wall 68 including fluid heating tubes 69 having their intertube spaces closed by metallic webs cooperates with the combustion chamber 30 and the lower half of the circumferential wall of the header 42 to define the gas pass 34 and cooperates with the vessel 26 to define the space 38 and a portion of the spaces 38A, 38B. Adjacent pairs of lower ends of alternate tubes 69A of the tubes 69 are connected to the outer periphery of the header 59 as one by bifurcated tubular portions 69C to provide adequate header ligament efficiencies. Tubes 69A extend radially outwardly and horizontally from the tubular portions 69C, then vertically to form an upright circular screen 70, as shown in Fig. 3, then radially outwardly and upwardly at a slight angle to the horizontal to form a portion of the lower end of the gas pass 30, then vertically in closely spaced relation to the upright vessel 26 to form with remaining tubes 69B and the metallic webs between tubes the outer circular wall of the gas pass 30. The remaining or alternate tubes 69B of the tubes 69 have their lower ends connected to the header 59. Beyond the header 59 the tubes 69B extend vertically and are bent to form with the metallic webs therebetween curved walls 71 and 72 radially outwardly spaced from and parallel to the involute curved portions 66 and 67, respectively, of the circumferential wall of the combustion chamber 30, with the outer ends of the walls 71 and 72 overlapping the inlets 64 and 65, respectively, and radially outwardly spaced from and terminating approximately at the inner ends of the involute curved portions 67 and 66, respectively, and with the outer end of the wall 71 terminating at a point substantially radially outwardly spaced from the inner end of the wall 72 and the outer end of the wall 72 terminating at a point substantially radially outwardly spaced from the inner end of the wall 71. The tubes 69B then extend radially outwardly and upwardly at a slight angle to the horizontal between the tubes 69A to form with the tubes 69A and the metallic webs between tubes the lower end of the gas pass 30, and then extend vertically to form with the tubes 69A and the metallic webs between tubes the outer wall of the gas pass 34. Some of the tubes 69 have intermediate portions 69D bent into arc-shaped rows of widely spaced staggered tubes to permit flow of gases from the gas pass 34 to the conduit 36.

The tubes 69 in the portion of the outer wall of the gas pass 34 opposite the tube bank 40 are bent radially inwardly and horizontally at the top of the outer wall to form with the metallic webs therebetween a portion of the upper end of the gas pass 34 and adjacent pairs of these tubes have their discharge ends connected to the outer periphery of the header 42 as one by bifurcated tubular portions 69D to provide adequate header ligament efficiencies. Of the remaining tubes 69 in the outer wall of the gas pass 34, half are bent radially, inwardly and horizontally at the top of the outer wall of the gas pass 34 to form with the metallic webs therebetween a portion of the upper end of the gas pass 34 and have their discharge ends directly connected to the outer periphery of the header 42; and the other half are bent radially inwardly and upwardly in spaced relation to provide a screen 73 subjacent the header 42 extending between the ends of but not including the tube bank 40, for the protection of the header 42 from the high temperature heating gases, with half of these tubes having their discharge ends directly connected to the bottom of the header 42 and the remaining tubes reversely bent and connected to the inner periphery of the header 42.

An upright radially extending baffle 74 comprising upwardly extending fluid heating tubes 75 having their intertube spaces closed by metallic webs is disposed between and connected to the combustion chamber 30 and the outer wall of the gas pass 34, extends between the upper and lower ends of the gas pass 34, terminates at its inner end at a position adjacent the gas outlet 32 and at its outer end at a location adjacent to and downstream gas-wise of the inlet to the conduit 36, and cooperates with the enclosing walls of the gas pass 34 to direct the gases flowing from the combustion chamber through the gas pass 34 to the conduit 36. The tubes 75 have their lower ends connected to a horizontally arranged radially extending tubular header 76 disposed subjacent the lower end of the gas pass 34, their upper ends connected to the header 42, and pass through the lower end of the gas pass 34 in sealing relation therewith. The header 76 extends through bent portions of the tubes of the screen 70 and is supplied with liquid from the drum 46 by tubes 77 extending through the vessel 26 in sealing relation therewith. Upwardly extending widely spaced fluid heating tubes 78 arranged in a radially extending row across the gas pass 34 and between the screen 62 and the tube bank 40 provide a screen against the high temperature heating gases for the end of the header 44 first encountered by the gases. The tubes 78 have their upper ends connected to the header 42, their lower ends connected to a horizontally arranged radially extending tubular header 79 disposed subjacent the lower end of the gas pass, and pass through the lower end of the gas pass 34 in sealing relation therewith. The header 79 passes between suitably bent portions of the tubes of the screen 70 and is supplied with liquid from the drum 46 by tubes 80 extending through the vessel 26 in sealing relation therewith.

Combustion air is supplied by the compressor 10 at a pressure of about 83 p.s.i.a. and temperature of 460° F. through the airheater 14, which is preferably of the tubular type, to the vessel 26 at about 650° F. by way of a conduit 81 having its discharge end registering with a circular flanged opening 82 formed in the circumferential wall of the vessel 26 at a location subjacent the lower end of the gas pass 34. While high pressure air flows through the opening 82 to the inlets 64, 65 of the combustion chamber 30, the spaces 38, 38A and 38B are maintained by this air under a pressure 2–4 p.s.i. higher than the heating gas pressure at any point along its flow path, so that any leakage through the outer boundary walls of the gas pass 34 and the portions of the combustion chamber 30 beneath the lower end of the gas pass 34 and adjacent the upper end thereof is inward toward the gas flow path rather than outward to avoid the blasting of the hot gases on the walls of the vessel 26. Thus, the outward thrust of the heating gases on the inner side of the outer boundary walls of the gas pass 34 and on the inner side of the boundary walls of the portions of the combustion chamber 30 beneath the gas pass 34 and adjacent the upper end thereof is counterbalanced by the thrust of the air acting on the outer side of the same boundary walls, resulting in a differential thrust of only a few pounds. The relatively small differential thrust on these boundary walls coupled with the circular form thereof minimizes the need for lateral steel supports on these boundary walls to prevent warping or buckling thereof.

Each of the inlets 64, 65 is occupied by a row of vertically spaced horizontally arranged tubular natural gas burners 83. The burners 83 extend through the vessel 26 in sealing relation therewith and between bent portions of the tubes of the screen 70, have their discharge ends provided with suitable nozzles for dispersion of the gas, and are arranged so that the gas discharged therefrom enters the combustion chamber with the high pressure combustion air substantially tangentially to the involute curved portions of the circumferential wall of the combustion chamber. Fuel-air streams from the inlet 64 enter the combustion chamber with the same direction of rotation as the fuel-air streams from the inlets 65. With the fuel and air inlets arranged as described, combustion of the gaseous fuel progresses at a high rate and the high velocity of the burning fuel and air causes the gas stream to follow a whirling path of travel upwardly through the combustion chamber before passing through the outlet 32 and over the screen 62 to the gas inlet 34A of the gas pass 34. The baffle 74 cooperates with the boundary walls of the gas pass 34 to direct the gases entering the inlet 34A in a substantially arcuate path of travel through the gas pass 34 and consecutively over the screen tubes 78, the tube bank 40 and the superheater 52 positioned therein. From the superheater 52 the gases discharge to the outlet 34B, and thence pass over the tube portions 69D and through the conduit 36 to the gas turbine 12. Gases discharge from the gas turbine 12 at a temperature of about 840° F., then flow over the airheater 14 and the economizer 24 to the stack at a temperature of around 300° F.

Feedwater at a pressure of about 1400 p.s.i. is supplied by a feed pump, not shown, through feedwater heaters, not shown, using steam bled from the turbine 18. The partially heated feedwater then passes through the economizer 24 and a conduit 84 to the drum 46.

Steam and water mixtures generated in the tubes of the tube bank 40, the screens 62 and 78 and the boundary walls of the combustion chamber 30 and gas pass 34 discharge to the drum 46. Saturated steam is supplied from the drum 46 to the superheater inlet header 54 by tubular conduit 55, the steam then passing through the tubes of the superheater 52, the superheater outlet header 56 and the conduit 57 to the steam turbine 18 for expansion therein.

While in accordance with the provisions of the statutes I have illustrated and described herein the best form of the invention known to me, those skilled in the art will understand that changes may be made without departing from the spirit of the invention covered by my claims, and that certain features of my invention may sometimes be used to advantage without a corresponding use of other features.

What is claimed is:

1. A fluid heating unit comprising walls defining an upright vessel, walls including fluid heating tubes defining an upright combustion chamber disposed longitudinally and in the central portion of said vessel, wall means including fluid heating tubes disposed between said vessel and combustion chamber and cooperating with said combustion chamber to define a gas pass therebetween and with said vessel to define a space therebetween for air under pressure extending throughout substantially the entire periphery of said gas pass, a fluid heating tube bank in said gas pass, means for introducing fuel and air into said combustion chamber substantially tangentially to the circumferential wall thereof and effecting a whirling path of travel therein along the circumferential wall, while maintaining an air pressure throughout said space at least equal to the gas pressure in said combustion chamber, a gas outlet from said combustion chamber opening to said gas pass at a position upstream gas-wise of said tube bank, means forming a gas exit through said wall means and vessel and opening to said gas pass at a position downstream gas-wise of said tube bank, and baffle means disposed outside of said combustion chamber and across said gas pass and extending between said gas outlet and said gas exit from a position adjacent said gas outlet to a position adjacent said gas exit, said baffle means having substantially its entire extent exposed to the heating gases as they discharge from said combustion chamber and being arranged to direct the gases flowing from said combustion chamber through said gas pass and over the tube bank therein to said gas exit.

2. A fluid heating unit comprising walls defining an upright vessel, walls including fluid heating tubes defining an upright combustion chamber disposed longitudinally and in the central portion of said vessel, wall means including fluid heating tubes disposed between said vessel and combustion chamber and cooperating with said combustion chamber to define a gas pass therebetween extending along only a portion of the length of said combustion chamber and with said vessel to define a space therebetween for air under pressure extending throughout substantially the entire periphery of said gas pass, a fluid heating tube bank in said gas pass, means associated with another portion of the length of the combustion chamber for introducing fuel and air into said combustion chamber adjacent one end and substantially tangentially to the circumferential wall thereof and effecting a whirling path of travel therein along the circumferential wall, while maintaining an air pressure throughout said space at least equal to the gas pressure in said combustion chamber, a gas outlet from said combustion chamber at a location in said combustion chamber between the opposite end thereof and the zone of fuel and air entry thereto and opening to said gas pass at a position upstream gas-wise of said tube bank, means forming a gas exit through said wall means and vessel and opening to said gas pass at a position downstream gas-wise of said tube bank, and baffle means disposed outside of said combustion chamber and across said gas pass and extending between said gas outlet and said gas exit from a position adjacent said gas outlet to a position adjacent said gas exit, said baffle means having substantially its entire extent exposed to the heating gases as they discharge from said combustion chamber and being arranged to direct the gases flowing from said combustion chamber through said gas pass and over the tube bank therein to said gas exit.

3. A supercharged fluid heating unit comprising walls defining an upright vessel, walls including fluid heating tubes defining an upright combustion chamber of substantially circular cross-section disposed longitudinally and in the central portion of said vessel, wall means including fluid heating tubes disposed between said vessel and combustion chamber and cooperating with said combustion chamber to define an upwardly elongated gas pass therebetween extending along only a portion of the length of said combustion chamber and with said vessel to define an upwardly elongated space therebetween for air under pressure extending throughout substantially the entire periphery of said gas pass, a fluid heating tube bank in said gas pass, means associated with another portion of the length of the combustion chamber for introducing fuel and air into said combustion chamber substantially tangentially to the circumferential wall thereof and effecting a whirling path of travel therein along the circumferential wall, while maintaining an air pressure throughout said space at least equal to the gas pressure in said combustion chamber, said last named means including an axially elongated fuel and air inlet means including an axially elongated fuel and air inlet adjacent one end of said combustion chamber arranged substantially tangentially to the circumferential wall thereof, an axially elongated gas outlet in the circumferential wall of said combustion chamber at a location in said combustion chamber between the opposite end thereof and said fuel and air inlet and opening to said gas pass at a position upstream gas-wise of said tube bank, means forming a gas exit through said wall means and vessel and opening to said gas pass at a position downstream gas-wise of said tube bank, and baffle means in said gas pass extending transversely and along the height thereof and between said gas outlet and said gas exit from a position adjacent said gas outlet to a position adjacent said gas exit, said baffle means being disposed outside of said combustion chamber and having substantially its entire extent exposed to the heating gases as they discharge from said combustion chamber and being arranged to direct the gases flowing from said combustion chamber through said gas pass and over the tube bank therein to said gas exit.

4. A vapor generating unit having a fluid circulation system and comprising walls defining an upright vessel, walls including upwardly extending vapor generating tubes defining an upright substantially cylindrical combustion chamber disposed concentrically within said vessel, wall means including upwardly extending vapor generating tubes disposed between said vessel and combustion chamber and cooperating with said combustion chamber to define an upwardly elongated gas pass therebetween extending along only a portion of the length of said combustion chamber and with said vessel to define an upwardly elongated space therebetween for air under pressure extending throughout substantially the entire periphery of said gas pass, a vapor generating tube bank in said gas pass disposed across the flow of gases therein, a superheater in said gas pass disposed across the flow of gases therein and connected for fluid flow from the vapor generating tubes, means associated with another portion of the length of the combustion chamber for introducing fuel and air into said combustion chamber and effecting a whirling path of travel therein along the circumferential wall, while maintaining an air pressure throughout said space at least equal to the gas pressure in said combustion chamber, said last named means including an axially elongated fuel and air inlet adjacent one end of said combustion chamber arranged substantially tangentially to the circumferential wall thereof, an axially elongated gas outlet in the circumferential wall of said combustion chamber at a location in said combustion chamber between the opposite end thereof and said fuel and air inlet and opening to one end of said gas pass, means forming a gas exit through said wall means and vessel and opening to the opposite end of said gas pass, baffle means in said gas pass extending transversely and along the height thereof and between said gas outlet and said gas exit from a position adjacent said gas outlet to a position adjacent said gas exit, said baffle means being disposed outside of said combustion chamber and having substantially its entire extent exposed to the heating gases as they discharge from said combustion chamber and being arranged to direct the gases flowing from said combustion chamber through said gas pass and over the tube bank and superheater therein to said gas exit, and means for connecting the vapor generating tubes into the fluid circulation system.

5. A supercharged vapor generating unit having a fluid circulation system and comprising walls defining an upright vessel, walls including upwardly extending vapor generating tubes defining an upwardly elongated substantially cylindrical combustion chamber disposed concentrically within said vessel, wall means including upwardly extending vapor generating tubes disposed between said vessel and combustion chamber and cooperating with said combustion chamber to define an upwardly elongated gas pass therebetween extending along only a portion of the length of said combustion chamber and with said vessel to define an upwardly elongated space therebetween for air under pressure extending throughout substantially the entire periphery of said gas pass, a vapor generating tube bank in said gas pass disposed across the flow of gases therein, a superheater in said gas pass at a position downstream gas-wise of said tube bank disposed across the flow of gases therein and connected for fluid flow from the vapor generating tubes, means associated with another portion of the length of the combustion chamber for introducing fuel and air into said combustion chamber and effecting a whirling path of travel therein along the circumferential wall, while maintaining an air pressure throughout said space at least equal to the gas pressure in said combustion chamber, said last named means including an axially elongated fuel and air inlet adjacent the lower end of said combustion chamber arranged substantially tangentially to an involute curved portion of the circumferential wall thereof, an axially elongated gas outlet in the circumferential wall of said combustion chamber at a location in said combustion chamber between the upper end thereof and said fuel and air inlet and opening to said gas pass at a position upstream gas-wise of said tube bank along substantially the full height thereof, means forming a gas exit through said wall means and vessel and opening to said gas pass at a position downstream gas-wise of and adjacent to said superheater, baffle means in said gas pass extending transversely and along the height thereof and between said gas outlet and said gas exit from a position adjacent said gas outlet to a position adjacent said gas exit, said baffle means being disposed outside of said combustion chamber and having substantially its entire extent exposed to the heating gases as they discharge from said combustion chamber and being arranged to direct the gases flowing from said combustion chamber through said gas pass and over the tube bank and superheater therein to said gas exit, and means for connecting the vapor generating tubes into said fluid circulation system.

6. A fluid heating unit comprising walls defining an upright vessel of substantially circular cross-section, walls including fluid heating tubes defining an upright combustion chamber of substantially circular cross-section disposed longitudinally and in the central portion of said vessel, wall means including fluid heating tubes disposed between said vessel and combustion chamber and cooperating with said combustion chamber to define an upwardly elongated gas pass therebetween and with said vessel to define an upwardly elongated space therebetween for air under pressure extending throughout substantially the entire periphery of said gas pass, a fluid heating tube bank in said gas pass, means for introducing fuel and air into said combustion chamber substantially tangentially to the circumferential wall thereof and effecting a whirling path of travel therein along the circumferential wall, while maintaining an air pressure throughout said space at least equal to the gas pressure in said combustion chamber, a gas outlet from said combustion chamber opening to said gas pass at a position upstream gas-wise of said tube bank, means forming a gas exit through said wall means and vessel and opening to said gas pass at a position downstream gas-wise of said tube bank, and baffle means disposed outside of said combustion chamber and across said gas pass and extending between said gas outlet and said gas exit from a position adjacent said gas outlet to a position adjacent said gas exit, said baffle means having substantially its entire extent exposed to the heating gases as they discharge from said combustion chamber and being arranged to direct the gases flowing from said combustion chamber through said gas pass and over the tube bank therein to said gas exit.

7. A supercharged fluid heating unit comprising walls defining an upright vessel of substantially circular cross-section, walls including fluid heating tubes defining an upright combustion chamber of substantially circular cross-section disposed concentrically within said vessel, wall means including fluid heating tubes disposed between said vessel and combustion chamber and cooperating with said combustion chamber to define an upwardly elongated annular gas pass therebetween extending along only a portion of the length of said combustion chamber and with said vessel to define an upwardly elongated annular space therebetween for air under pressure extending throughout substantially the entire periphery of said gas pass, a fluid heating tube bank in said gas pass disposed across the flow of gases therein, means associated with another portion of the length of the combustion chamber for introducing fuel and air into said combustion chamber and effecting a whirling path of travel therein along the circumferential wall, while maintaining an air pressure throughout said space at least equal to the gas pressure in said combustion chamber, said last named means including an axially elongated fuel and air inlet adjacent one end of said combustion chamber arranged substantially tangentially to the circumferential wall thereof, an axially elongated gas outlet in the circumferential wall of said combustion chamber at a location in said combustion chamber between the opposite end thereof and said fuel and air inlet and opening to said gas pass at a position upstream gas-wise of said tube bank, means forming a gas exit through said wall means and vessel and opening to said gas pass at a position downstream gas-wise of said tube bank, and baffle means in said gas pass extending transversely and along the height thereof and between said gas outlet and said gas exit from a position adjacent said gas outlet to a position adjacent said gas exit, said baffle means being disposed outside of said combustion chamber and having substantially its entire extent exposed to the heating gases as they discharge from said combustion chamber and being arranged to direct the gases flowing from said combustion chamber through said gas pass and over the tube bank therein to said gas exit.

8. A supercharged vapor generating unit having a fluid circulation system and comprising walls defining an upright vessel of substantially circular cross-section, walls including upwardly extending vapor generating tubes defining an upright combustion chamber of substantially circular cross-section disposed concentrically within said vessel, wall means including upwardly extending vapor generating tubes disposed between said vessel and combustion chamber and cooperating with said combustion chamber to define an upwardly elongated annular gas pass therebetween extending along only a portion of the length of said combustion chamber and with said vessel to define an upwardly elongated annular space therebetween for air under pressure extending throughout substantially the entire periphery of said gas pass, a vapor generating tube bank in said gas pass disposed across the flow of gases therein, a superheater in said gas pass disposed across the flow of gases therein and connected for fluid flow from the vapor generating tubes, means associated with another portion of the length of the combustion chamber for introducing fuel and air into said combustion chamber and effecting a whirling path of travel therein along the circumferential wall, while maintaining an air pressure throughout said space at least equal to the gas pressure in said combustion chamber, said last named means including an axially elongated fuel and air inlet adjacent the lower end of said combustion chamber arranged substantially tangentially to an involute curved portion of the circumferential wall thereof, an axially elongated gas outlet in the circumferential wall of said combustion chamber at a location in said combustion chamber between the upper end thereof and said fuel and air inlet and opening to one end of said gas pass, means forming a gas exit through said wall means and vessel and opening to the opposite end of said gas pass, baffle means in said gas pass extending transversely and along the height thereof and between said gas outlet and said gas exit from a position adjacent said gas outlet to a position adjacent said gas exit, said baffle means being disposed outside of said combustion chamber and having substantially its entire extent exposed to the heating gases as they discharge from said combustion chamber and being arranged to direct the gases flowing from said combustion chamber through said gas pass and over the tube bank and superheater therein to said gas exit, and means for connecting the vapor generating tubes into said fluid circulation system.

9. A supercharged vapor generating unit having a fluid circulation system and comprising walls defining an upright substantially cylindrical vessel, walls including upwardly extending vapor generating tubes defining an upright substantially cylindrical combustion chamber disposed concentrically within said vessel, wall means including upwardly extending vapor generating tubes disposed between said vessel and combustion chamber and cooperating with said combustion chamber to define an upwardly elongated annular gas pass therebetween extending along only a portion of the length of said combustion chamber and with said vessel to define an upwardly elongated annular space therebetween for air under pressure extending throughout substantially the entire periphery of said gas pass, a vapor generating tube bank in said gas pass disposed across the flow of gases therein, a superheater in said gas pass at a position downstream gas-wise of said tube bank disposed across the flow of gases therein and connected for fluid flow from the vapor generating tubes, means associated with another portion of the length of the combustion chamber for introducing fuel and air into said combustion chamber and effecting a whirling path of travel therein along the circumferential wall, while maintaining an air pressure throughout said space at least equal to the gas pressure in said combustion chamber, said last named means including axially elongated circumferentially spaced fuel and air inlets adjacent the lower end of said combustion chamber arranged substantially tangentially to the circumferential wall thereof, an axially elongated gas outlet in the circumferential wall of said combustion chamber at a location in said combustion chamber between the upper end thereof and said fuel and air inlets and opening to said gas pass at a position upstream gas-wise of said tube bank along substantially the full height thereof, means forming a gas exit through said wall means and vessel and opening to said gas pass at a position downstream gas-wise of and adjacent to said superheater, baffle means in said gas pass extending transversely and along the height thereof and between said gas outlet and said gas exit from a position adjacent said gas outlet to a position adjacent said gas exit, said baffle means being disposed outside of said combustion chamber and having substantially its entire extent exposed to the heating gases as they discharge from said combustion chamber and being arranged to direct the gases flowing from said combustion chamber through said gas pass and over the tube bank and superheater therein to said gas exit, and means for connecting the vapor generating tubes into said fluid circulation system.

10. A supercharged vapor generating unit having a natural circulation fluid circulation system and comprising a horizontally arranged vapor-liquid drum, walls defining an upright vessel of substantially circular cross-section disposed subjacent said drum and arranged with its axis substantially vertical, walls including upwardly extending vapor generating tubes defining an upright combustion chamber of substantially circular cross-section disposed concentrically within said vessel, wall means including upwardly extending vapor generating tubes disposed between said vessel and combustion chamber and cooperating with said combustion chamber to define an upwardly elongated annular gas pass therebetween extending along only a portion of the length of said combustion chamber and with said vessel to define an upwardly elongated annular space therebetween for air under pressure extending throughout substantially the entire periphery of said gas pass, a vapor generating tube bank in said gas pass disposed across the flow of gases therein, a superheater in said gas pass disposed across the flow of gases therein and connected for fluid flow from the liquid and vapor drum, means associated with another portion of the length of the combustion chamber for introducing fuel and air into said combustion chamber and effecting a whirling path of travel therein along the circumferential wall, while maintaining an air pressure throughout said space at least equal to the gas pressure in said combustion chamber, said last named means including an axially elongated fuel and air inlet adjacent the lower end of said combustion chamber arranged substantially tangentially to the circumferential wall thereof, an axially elongated gas outlet in the circumferential wall of said combustion chamber at a location in said combustion chamber between the upper end thereof and opening to one end of said gas pass along substantially the full height thereof, means forming a gas exit through said wall means and vessel and opening to the opposite end of said gas pass, baffle means in said gas pass extending transversely and along the height thereof and between said gas outlet and said gas exit from a position adjacent said gas outlet to a position adjacent said gas exit, said baffle means being disposed outside of said combustion chamber and having substantially its entire extent exposed to the heating gases as they discharge from said combustion chamber and being arranged to direct the gases flowing from said combustion chamber through said gas pass and over the tube bank and superheater therein to said gas exit, and means for connecting the vapor generating tubes into said fluid circulation system for fluid flow to and from said drum.

11. A supercharged vapor generating unit having a natural circulation fluid circulation system and comprising a horizontally arranged vapor-liquid drum, walls defining an upwardly elongated substantially cylindrical vessel disposed subjacent said drum and arranged with its axis substantially vertical, walls including upwardly extending vapor generating tubes defining an upwardly elongated substantially cylindrical combustion chamber disposed concentrically within said vessel, wall means including upwardly extending vapor generating tubes disposed between said vessel and combustion chamber and cooperating with said combustion chamber to define an upwardly elongated annular gas pass therebetween extending along only a portion of the length of said combustion chamber and with said vessel to define an upwardly elongated annular space therebetween for air under pressure extending throughout substantially the entire periphery of said gas pass, a vapor generating tube bank in said gas pass including radially spaced arc-shaped rows of upwardly extending tubes disposed across the flow of gases therein, a superheater in said gas pass at a position downstream gas-wise of said tube bank and including multi-looped upwardly extending tubes arranged in radially spaced arc-shaped platens disposed across the flow of gases therein and connected for fluid flow from the liquid and vapor drum, means associated with another portion of the length of the combustion chamber for introducing fuel and air into said combustion chamber and effecting a whirling path of travel therein along the circumferential wall, while maintaining an air pressure throughout said space at least equal to the gas pressure in said combustion chamber, said last named means including axially elongated circumferentially spaced fuel and air inlets adjacent the lower end of said combustion chamber arranged substantially tangentially to involute curved portions of the circumferential wall thereof, an axially elongated gas outlet in the circumferential wall of said combustion chamber at a location in said combustion chamber between the upper end thereof and said fuel and air inlets and opening to said gas pass at a position upstream gas-wise of said tube bank along substantially the full height thereof, means forming a gas exit through said wall means and vessel and opening to said gas pass at a position downstream gas-wise of and adjacent to said superheater, baffle means in said gas pass extending transversely and along the height thereof and between said gas outlet and said gas exit from a position adjacent said gas outlet to a position adjacent said gas exit, said baffle means being disposed outside of said combustion chamber and having substantially its entire extent exposed to the heating gases as they discharge from said combustion chamber and being arranged to direct the gases flowing from said combustion chamber in a substantially arcuate path of travel through said gas pass and over the tube bank and superheater therein to said gas exit, and means for connecting the vapor generating tubes into said fluid circulation system for fluid flow to and from said drum.

References Cited in the file of this patent

UNITED STATES PATENTS

| | | |
|---|---|---|
| 1,917,275 | Rossman et al. | July 11, 1933 |
| 2,567,695 | Cox | Sept. 11, 1951 |
| 2,854,961 | Daman | Oct. 7, 1958 |

FOREIGN PATENTS

| | | |
|---|---|---|
| 1,137,611 | France | Jan. 14, 1957 |